United States Patent [19]

Kurose et al.

[11] Patent Number: 5,616,398
[45] Date of Patent: Apr. 1, 1997

[54] MAGNETIC RECORDING MEDIUM

[75] Inventors: Shigeo Kurose; Yoshihiro Honjo; Akira Somiya, all of Nagano, Japan

[73] Assignee: TDK Corporation, Tokyo, Japan

[21] Appl. No.: 240,475

[22] Filed: May 10, 1994

[30]   Foreign Application Priority Data

May 14, 1993  [JP]  Japan ................................ 5-136687
Apr. 21, 1994 [JP]  Japan ................................ 6-106017

[51] Int. Cl.$^6$ .............................. G11B 5/66; G11B 5/702
[52] U.S. Cl. .............. 428/141; 428/694 B; 428/694 BU; 428/694 BB; 428/694 BR; 428/694 BN; 428/900
[58] Field of Search ...................... 428/694 BB, 694 BR, 428/694 BN, 141, 323, 143, 900, 694 TB, 694 TR, 694 B, 694 BU

[56]              References Cited

U.S. PATENT DOCUMENTS 4,612,244  9/1986  Kaneda et al. ..................... 428/323
5,147,720  9/1992  Kawakami ......................... 428/336

FOREIGN PATENT DOCUMENTS 0494793   7/1992  European Pat. Off. .
54-21248   7/1979  Japan .
57-53825   3/1982  Japan .
59-14127   1/1984  Japan .
60-45938   3/1985  Japan .
60-45937   3/1985  Japan .
 479054  12/1992  Japan .
 481256  12/1992  Japan .
 481261  12/1992  Japan .

*Primary Examiner*—Paul J. Thibodeau
*Assistant Examiner*—Stephen Sand
*Attorney, Agent, or Firm*—Oblon, Spivak, McClelland, Maier & Neustadt, P.C.

[57]               ABSTRACT

A magnetic recording medium includes a non-magnetic base film, and a magnetic layer on one surface thereof and a back coat layer on the other surface thereof. The back coat layer contains two kinds of carbon blacks varying in the average particle diameter, and a binder containing two kinds of copolymers. These two copolymers comprise vinyl chloride, alkylcarboxylic acid vinyl ester and vinyl alcohol, one being a copolymer A having an average polymerization degree of 300 to 600, and the other a copolymer B having an average polymerization degree of 200 to 800. This makes it possible to achieve a magnetic recording medium having a back coat layer, which is excellent in surface properties and electromagnetic characteristics, and has high running stability and durability.

9 Claims, No Drawings

MAGNETIC RECORDING MEDIUM

BACKGROUND OF THE INVENTION

1. Technical Field

The present invention relates to a magnetic recording medium including a back coat layer.

2. Background Art

As recordings are made at shorter wavelength and higher density than ever before, the magnetic layer of a magnetic recording medium is required to have higher surface smoothness and more improved running stability. Thus, the importance of the back coat layer used with the magnetic recording medium as means for achieving improved surface smoothness and running stability becomes now steadily increasing.

The electromagnetic characteristics of the magnetic recording medium are enhanced by improving the surface roughness (Ra) of the back coat layer and thereby making the surface thereof smooth. However, the magnetic recording medium drops in running stability, as the surface of the back coat layer becomes smooth or the coefficient of friction $\mu$ of the back coat layer increases. As the surface roughness of the back coat layer is increased to enhance the running stability of the magnetic recording medium, there is a drop of the surface properties of the magnetic layer, resulting in a drop of the electromagnetic characteristics thereof. For the back coat layer, it is thus desired that its surface be made so smooth that its surface properties can be improved with a drop of the coefficient of friction $\mu$. This enables the magnetic recording medium to be improved in terms of running stability and yet without giving rise to any considerable deterioration of the electromagnetic characteristics of the magnetic layer.

One way to achieve smoothness is to decrease the average particle diameter of carbon black, fine inorganic particle or other filler contained in the back coat layer. This enables the surface of the back coat layer to be smoothened with some improvements in Ra and electromagnetic characteristics, but causes the coefficient of friction $\mu$ to become too high to obtain good-enough running stability.

To solve these problems, it has been put forward to use two kinds of filler (e.g., carbon black or fine inorganic) particles of varying particle diameters, use fillers and binders at specific quantitative ratios, or place some specific limitation on the average surface roughness Ra, as typically set forth in JP-A 54-21248, JP-A 57-53825, JP-A 59-14127, JP-A 60-45938, JP-B 4-79054, JP-B 4-81256, and JP-B 4-81261.

All these proposals make use of fillers having extremely varying particle diameters for the purpose of lowering the average surface roughness Ra, thereby achieving good-enough electromagnetic characteristics and decreasing the coefficient of friction $\mu$. However, the combined use of these two kinds of carbon blacks or other fillers, if they were less dispersible in the back coat layer, would often give rise to an increase in Ra, resulting in some deterioration of the surface properties of tape.

DISCLOSURE OF THE INVENTION

A primary object of the invention is to provide a magnetic recording medium including a back coat layer having good-enough surface properties and a low coefficient of friction $\mu$, so that the magnetic recording medium can be much improved in terms of electromagnetic characteristics, running stability, running durability, and storability.

Such an object is achieved by the present invention, as set out in the following (1) through (11).

(1) A magnetic recording medium including a non-magnetic base film, and a magnetic layer on one surface thereof and a back coat layer on the other surface thereof, wherein said back coat layer contains two kinds of carbon blacks differing in the average particle diameter, and a binder, said binder containing a vinyl chloride-alkylcarboxylic acid vinyl ester-vinyl alcohol copolymer A having an average polymerization degree of 300 to 600 and a vinyl chloride-alkylcarboxylic acid vinyl ester-vinyl alcohol copolymer B containing an amino group, and having an average polymerization degree of 200 to 800.

(2) A magnetic recording medium as recited in the above (1), wherein said back coat layer contains 15 to 120 parts by weight of said copolymer B per 100 parts by weight of said copolymer A.

(3) A magnetic recording medium as recited in the above (1), wherein said copolymer A contains 77 to 96.5% by weight of vinyl chloride, 0.5 to 8% by weight of alkylcarboxylic acid vinyl ester, and 3 to 10% by weight of vinyl alcohol.

(4) A magnetic recording medium as recited in the above (1), wherein said copolymer B contains 72 to 96.45% by weight of vinyl chloride, 0.5 to 8% by weight of alkylcarboxylic acid vinyl ester, 3 to 10% by weight of vinyl alcohol, and 0.05 to 5% by weight of an amino group-containing vinyl unit.

(5) A magnetic recording medium as recited in the above (1), wherein said carbon blacks are a carbon black of a small particle diameter as represented by an average particle diameter of 15 to 30 nm and a carbon black of a large particle diameter as represented by an average particle diameter of 200 to 400 nm.

(6) A magnetic recording medium as recited in the above (5), wherein said back coat layer contains 0.5 to 5 parts by weight of said carbon black of a large particle diameter per 100 parts by weight of said carbon black of a small particle diameter.

(7) A magnetic recording medium as recited in the above (5), wherein said carbon black of a small particle diameter has a BET value of 100 to 300 m$^2$/g, and said carbon black of a large particle diameter has a BET value of 5 to 20 m$^2$/g.

(8) A magnetic recording medium as recited in the above (1), wherein said back coat layer contains 50 to 200 parts by weight of said binder per 100 parts by weight of said carbon blacks.

(9) A magnetic recording medium as recited in the above (1), wherein the surface roughnesses Rmax and Ra of said back coat layer conform to:

Ra≦20 nm 350 nm≧Rmax−Ra≧50 nm

(10) A magnetic recording medium as recited in the above (1), wherein said binder further contains polyurethane having a polar group.

(11) A magnetic recording medium including a non-magnetic base film, and a magnetic layer on one surface thereof and a back coat layer on the other surface thereof, wherein the surface roughnesses Rmax and Ra of said back coat layer conform to:

Ra≦20 nm 350 nm≧Rmax−Ra≧50 nm

ACTION AND EFFECT

The back coat layer of the magnetic recording medium according to the invention contains two kinds of carbon blacks differing in the average particle diameter, and a binder containing two kinds of copolymers. One of such copolymers is Copolymer A comprising vinyl chloride, alkylcarboxylic acid viny ester and vinyl alcohol, and having an average polymerization degree of 300 to 600, and the other Copolymer B comprising vinyl chloride, alkylcarboxylic acid vinyl ester and vinyl alcohol, containing an amino group, and having an average polymerization degree of 200 to 800. Preferably, said carbon blacks are small one having an average particle diameter of 15 to 30 nm and large one having an average particle diameter of 200 to 400 nm.

When only small carbon black having an average particle diameter of the order of 15 to 30 nm for instance is used for a back coat layer, it is usually possible to obtain a magnetic recording medium excellent in surface smoothness, and electromagnetic characteristics, because of an increased Ra. At the same time, however, this causes the peak roughness (Rmax) of the back coat layer to become too low or the coefficient of friction $\mu$ of the back coat layer to become high; so the running stability of the magnetic recording medium becomes worse.

To prevent the coefficient of friction $\mu$ of the back coat layer from becoming high while the smoothness of the back coat layer is kept high, large carbon black particles having an average particle diameter of about 200 to 400 nm may be used in combination with the small carbon black particles to increase Rmax. However, when the carbon blacks are poor in dispersibility, there is an increase in Ra, which then makes the surface smoothness of the back coat layer worse and, hence, causes the electromagnetic characteristics of the magnetic recording medium to drop. In order for the back layer to have high surface smoothness simultaneously with a high coefficient of friction $\mu$, it is thus preferable that the Rmax and Ra of the back coat layer conform to $$Ra \leqq 20 \text{ nm}$$

$$50 \text{ nm} \leqq Rmax - Ra \leqq 350 \text{ nm}$$

By use of the back coat layer conforming to the relations mentioned above in respect of Rmax and Ra it is possible to obtain a magnetic recording medium excellent in electromagnetic characteristics and running stability.

To establish the relations mentioned above in respect of Rmax and Ra, the magnetic recording medium of the invention use two copolymers as the binder in addition to using two kinds of carbon blacks of varying average particle diameters. In particular, Copolymer B makes a great contribution to increasing the affinity of the binder for the carbon blacks, etc., and the dispersibility of the carbon blacks, so that the back coat layer can be much more improved in terms of stability to heat and humidity.

Moreover, the combined use of Copolymer A makes it possible to obtain a back coat layer excellent in running durability and stability to heat and humidity. Thus, by use of the binder containing two such copolymers it is possible to improve the dispersibility of the carbon blacks and allow Ra and Rmax–Ra to come within the ranges mentioned above, thereby achieving good-enough running durability.

The back coat layer, because of having such a composition, makes it possible to obtain a magnetic recording medium which is improved in electromagnetic characteristics, has high running stability due to a decreased coefficient of friction $\mu$, and possesses excellent running durability with no wearing of the back coat layer. Such effect is achieved by the combined use of the binder composition mentioned above with two kinds of carbon blacks, while excellent electromagnetic characteristics and running stability are achieved by conforming to the relations mentioned above in respect of Ra and Rmax. Never until now is any back coat layer conforming to such Ra to Rmax relation proposed in the art.

ILLUSTRATIVE CONSTRUCTIONS

Some illustrative constructions of the invention will now be explained at great length.

The magnetic recording medium of the invention includes a non-magnetic base film, and a magnetic layer on one surface thereof and a back coat layer on the other surface thereof, said back coat layer containing carbon blacks and a binder.

Carbon blacks of various particulate shapes may be used for the back coat layer. To have improved surface properties, however, the back coat layer should preferably contain two carbon blacks having the following particle diameters. More specifically, it is desired that one carbon black be small one which has an average particle diameter of 15 to 30 nm, particularly 17 to 28 nm, and a BET value of about 100 to 300 $m^2/g$, and the other be large one which has an average particle diameter of 200 to 400 nm, particularly 250 to 370 nm, and a BET value of about 5 to 20 $m^2/g$. It is then desired that the back coat layer contain 0.5 to 5 parts by weight, particularly 0.5 to 2 parts by weight of large carbon black particles per 100 parts by small carbon black particles.

JP-B 4-81256 mentioned above refers in the example to a back coat layer containing 8.1 to 11.1 parts by weight of large carbon black particles per 100 parts by weight of small carbon black particles. When such a large amount of the large carbon black particles is incorporated in the back coat layer of the magnetic recording medium according to this invention, as referred to in the above publication, however, Ra increases excessively, making the surface properties of the back coat layer and, hence, the electromagnetic characteristics of the magnetic recording layer worse. In other words, too much large carbon black particles are likely to cause the Ra of the back coat layer to become too high and, hence, make the electromagnetic characteristics of the magnetic layer worse. On the other hand, too little makes the Rmax of the back coat layer likely to become low and the coefficient of friction $\mu$ of the back coat layer likely to become too high, resulting in running trouble or other faults.

When the small carbon black particles have too small an average particle diameter, Ra is likely to increase, because they are less dispersible in the coating material for the back coat layer. Too large an average particle diameter is again not preferable, because the Ra of the back coat layer is likely to increase. When the large carbon black particles have too small an average particle diameter, the coefficient of friction $\mu$ of the back coat layer is likely to become high, resulting in running trouble or other faults. Too large an average particle diameter, on the other hand, causes Ra to become high, making the surface smoothness of the magnetic layer likely to become worse and so making the electromagnetic characteristics of the magnetic layer likely to drop.

The content of the carbon blacks, viz., the total amount of the small and large carbon black particles should preferably account for 30 to 70% by weight, particularly 35 to 50% by weight, and more particularly 40 to 45% by weight of the back coat layer. Too much carbon blacks make the strength of the back coat layer likely to drop, thus making the running durability of the magnetic recording layer worse. Too little, on the other hand, incurs an increase in the coefficient of friction of the back coat layer, thus making running trouble or other faults likely to occur, and giving rise to another problem of blocking with the magnetic layer.

The average particle diameter of carbon black may be determined by taking a TEM (transmission electron microscope) photograph of carbon black particles, and measuring the actual diameters of about 1,000 randomly sampled particles.

Various binders may be used. To improve the dispersibility of the carbon blacks or the like used as the filler, however, it is preferable that the binder used contains Copolymers A and B. To improve the dispersibility of the binder and the physical and other properties of the coat, it is more preferable to additionally use polyurethane resin that is a rubbery elastomer.

For Copolymer A it is preferable to use a vinyl chloride-alkylcarboxylic acid vinyl ester-vinyl alochol copolymer having an average polymerization degree of 300 to 600, especially, 400 to 500.

For the alkylcarboxylic acid vinyl ester, vinyl acetate should preferably be used in view of raw material cost and other considerations. However, use may also be made of other alkylcarboxylic acid vinyl esters such as vinyl propionate, and vinyl versate. Vinyl alcohol is obtained by the saponification of the alkylcarboxylic acid group of the alkylcarboxylic acid vinyl ester portion.

Copolymer A should preferably contain the monomers at specific proportions, i.e., 77 to 96.5% by weight of vinyl chloride, 0.5 to 8% by weight of alkylcarboxylic acid vinyl ester, and 3 to 10% by weight of vinyl alcohol. Too much alkylcarboxylic acid vinyl ester makes the affinity of the binder for carbon blacks and the like likely to drop and the dispersibility of the binder worse. Too little, on the other hand, makes the solubility of the resin likely to become worse. Too much vinyl alcohol makes the thermal stability and storability of the back coat layer low and worse due to the high degree of saponification. Too little, on the other hand, makes the affinity of the binder for carbon blacks likely to drop due to a decrease in the concentration of the reactive hydroxyl group, and so make the dispersibility of the binder likely to become worse. In addition, this gives rise to a decrease in the amount of the binder bound to the crosslinking agent, which then makes the strength of the back coat layer prone to decrease.

The back coat layer, because of containing such Copolymer A, is particularly improved in terms of running stability, and strength properties including stability to heat and humidity, and so is most unlikely to wear off or otherwise peel off.

Copolymer A is prone to become poor in solubility, dispersibility and other properties at too high an average degree of polymerization, and makes the strength of the back coat layer likely to drop at too low an average degree of polymerization.

Copolymer A should preferably account for 30 to 60% by weight, especially, 40 to 50% by weight of the total amount of the resin as the binder. Too much Copolymer A makes Ra prone to become worse, while too little renders the strength of the back coat layer likely to drop and so the back coat layer prone to wear off or otherwise peel off.

Copolymer A may additionally contain less than about 5% by weight of other monomeric components, e.g., acrylate or methacrylate, hydroxyalkyl acrylate or methacrylate, acrylamide, methacrylamide, acrylonitrile, styrene, vinyltoluene, ethylene, propylene, butadiene, acrylic acid, maleic acid, maleate, maleic anhydride, and divinylbenzene.

Copolymer B is a vinyl chloride-alkylcarboxylic acid vinyl ester-vinyl alcohol copolymer which has an average polymerization degree of 200 to 800, particularly 300 to 750 and more particularly 300 to 600, and which should preferably further contain an amino group. Various amino groups may be used, but particular preference is given to using a dialkylamino group containing an alkyl group having 1 to 10 carbon atoms.

No limitation is placed on how to prepare Copolymer B, but it may usually be obtained by amination. The amination may usually be achieved by dispersing or dissolving a vinyl chloride-alkylcarboxylic acid vinyl ester copolymer in an organic solvent such as alcohol, and adding to the dispersion or solution an amine compound to be described below for saponification together with an epoxy group-containing compound acting as a saponification promoter.

For the alkylcarboxylic acid vinyl ester of the vinyl chloride-alkylcarboxylic acid vinyl copolymer it is preferable to use vinyl acetate in view of raw material cost and other considerations. Also, vinyl propionate, vinyl versate, etc., may be used.

The amine compounds used for amination, for instance, include primary, secondary or tertiary amines such as aliphatic amines, alicyclic amines, alkanolamines, alkoxyalkylamines, more illustratively, methylamine, ethylamine, propylamine, butylamine, cyclohexylamine, ethanolamine, naphthylamine, aniline, o-toluidine, diethylamine, dioctylamine, diisobutylamine, diethanolamine, methylethanolamine, dimethylethanolamine, dibutyl-ethanolamine, methyldiethanolamine, 2-methoxyethylamine, di-2-methoxyethylamine, N-methylaniline, trimethylamine, triethylamine, tri-isobutylamine, tridecylamine, N-methybutylamine, N-methylphenylamine, hexamethylenetetramine, triethanolamine, dimethylpropylamine, pyridine, α-picoline, β-picoline, γ-picoline, 2,4-lutidine, quinoline, morpholine, diaminopropane, and hexamethylenediamine.

The epoxy group-containing compounds that co-exist with the amine or other compounds as a saponification promoter, for instance, include ethylene oxide, propylene oxide, isobutylene oxide, n-butylene oxide, glycidyl n-butyl ether, glycidyl acrylate, glycidyl methacrylate, glycidyl phenyl ether, epichlorohydrin, and epoxy resins.

Copolymer B contains the constituent monomers at specific proportions, and should preferably contain 72 to 96.45% by weight of vinyl chloride, 0.5 to 8% by weight of alkylcarboxylic acid vinyl ester and 3 to 10% by weight of vinyl alcohol, and further contain 0.05 to 5% by weight of an amino group-containing vinyl unit. It is here noted that Copolymer B may additionally contain an ammonium base film and less than about 5% by weight of other monomeric components such as acrylate or methacrylate, hydroxyalkyl acrylate or methacrylate, acrylamide, methacrylamide, acrylonitrile, styrene, vinyltoluene, ethylene, propylene, butadiene, acrylic acid, maleic acid, maleate, maleic anhydride, and divinylbenzene.

Too much alkylcarboxylic acid vinyl ester makes the affinity of the binder for carbon blacks, etc., and hence the dispersibility of the binder prone to become worse. Too little, on the other hand, makes the solubility of the resin worse. Too much vinyl alcohol renders the thermal stability and storability of the magnetic recording medium prone to become worse due to the elevated degree of saponification.

Too little, on the other hand, makes the affinity of the binder for carbon blacks likely to drop due to a decrease in the concentration of the reactive hydroxyl group, and so make the dispersibility of the binder likely to become worse. In addition, this gives rise to a decrease in the amount of the binder bound to the crosslinking agent, which then makes the strength of the back coat layer prone to decrease.

By use of the amino group-containing copolymer it is possible to improve the dispersibility of carbon blacks, etc. Moreover, this copolymer shows an increased curing reactivity with respect to a polyisocyanate, etc., used as the crosslinking agent to be described later, so that the back coat layer can be cured to sufficient mechanical strength. Too little amino group-containing vinyl units have no appreciable effect on improvements in dispersibility, etc., and too much is prone to too rapid a reaction with the polyisocyanate, etc., resulting in deterioration of the calendering susceptibility of the back coat layer.

Copolymer B is prone to become poor in solubility, dispersibility and other properties at too high an average degree of polymerization, and makes the strength of the back coat layer likely to drop at too low an average degree of polymerization.

The binder, because of containing Copolymer B, is improved in terms of the affinity for carbon blacks, non-magnetic powders, etc., so that not only can the dispersibility of carbon blacks, etc., be increased, but also the stability to heat, humidity and the like of the back coat layer can be increased as well.

Copolymer B should preferably account for 10 to 35% by weight, especially, 15 to 30% by weight of the total amount of the binder resins. Too much Copolymer B makes the strength of the back coat layer prone to drop, while too little renders the dispersibility of carbon blacks, etc. prone to drop, thus making Ra likely to get worse and so the electromagnetic characteristics of the magnetic recording medium likely to drop.

It is preferable that the binder contains 15 to 120 parts by weight, especially, 30 to 100 parts by weight of Copolymer B per 100 parts by weight of Copolymer A. This proportion enables carbon blacks, etc., to be excellent in dispersibility and the magnetic recording medium to be excellent in running durability, etc. When the binder contains too much Copolymer B relative to Copolymer A, the strength of the back coat layer has a declining tendency, while too little makes the dispersibility of carbon blacks and the like worse.

As the polyurethane resin use may be made of every polyurethane resin usually used for conventional magnetic recording media. From the viewpoint of further improving the dispersibility of carbon blacks, etc., it is preferable to use a polyurethane resin containing a polar group. The use of polar group-free polyurethane lowers the dispersibility of carbon blacks, etc., and makes the surface properties, as by expressed in terms of Ra, of the back coat layer worse, thus resulting in an adverse influence on the magnetic layer and hence a drop of the electromagnetic characteristics of the magnetic layer.

More specifically, the polyurethane resin used should preferably include one or more polar groups such as sulfur-containing sulfonic or sulfuric acid group, or their ester or salt, phosphorus-containing phosphonic, phosphinic or phosphoric acid group, or their ester or salt, and a carboxylic acid group. Among others, preference is given to sulfonic ($-SO_3Y$), carboxylic ($-COOY$) and phosphonic ($-PO_3Y$) groups, where Y may be either a hydrogen atom or an alkali metal. Preferably, the polyurethane resin has about 0.1 to 5 such polar group molecules per polymer molecule.

Preferably, the polyurethane resin accounts for 20 to 60% by weight of the total amount of the resin. Too much polyurethane makes the strength of the back coat layer likely to drop, so causing the running durability of the magnetic recording medium to have a worsening tendency, while too little makes the back coat layer likely to become hard and brittle and hence wear off or otherwise peel off.

As the crosslinking agent for curing the binder it is preferable to use various polyisocyanates, especially, diisocyanates. It is particularly preferable to use tolylene diisocyanate and/or hexamethylene diisocyanate and/or methylene diisocyanate. This crosslinking agent reacts with the nitrogen atom, hydroxyl group, active hydrogen group and the like of the copolymers, and undergoes a crosslinking reaction with the active hydrogen group and the like of the polyurethane and polyester, so that the back coat layer can be cured and reinforced. Preferably, the content of the crosslinking agent is 10 to 30 parts by weight per 100 parts by weight of the resins.

Preferably, the content of the binder used for the back coat layer is 50 to 200 parts by weight, particularly 100 to 170 parts by weight, and more particularly 120 to 150 parts by weight per 100 parts by weight of the carbon blacks mentioned above. Too much binder causes the back coat layer to produce increased friction with the tape pads or guides of the cassette half used, and so makes the magnetic recording medium likely to snarl up. Too little, on the other hand, causes the strength of the back coat layer to have a declining tendency, and so makes the running durability of the magnetic recording medium worse. It is here noted that Copolymers A and B should preferably account for 40 to 80% by weight of the binder.

By use of the binder and carbon blacks mentioned above it is possible for the Ra and Rmax of the back coat layer to conform to the relations $Ra \leq 20$ nm, and $50$ nm$\leq$Rmax$-$Ra$\leq 350$ nm. This makes it possible to obtain a magnetic recording medium which is excellent in running durability or most unlikely to snarl up by reason of the wearing-off of the back coat layer.

Too large Ra is not preferable in view of the electromagnetic characteristics of the magnetic layer, because the surface smoothness of the back coat layer becomes worse. Too large (Rmax–Ra) makes the surface smoothness of the back coat layer worse, and so makes the surface smoothness and hence electromagnetic characteristics of the magnetic layer worse. Too small (Rmax–Ra) is broken down into two cases, (1) one in which Ra is much larger than Rmax and (2) the other in which Rmax becomes too small.

(1) When Ra is much larger than Rmax, the relation $Ra \leq 20$ nm is not satisfied; the surface smoothness of the back coat layer becomes too worse in view of the electromagnetic characteristics of the magnetic layer.

(2) When Rmax becomes too small, the coefficient of friction $\mu$ of the back coat layer becomes too high; so the magnetic recording medium is likely to snarl up.

By conforming to such relations between Ra and Rmax, it is possible to achieve a magnetic recording medium which excels in electromagnetic characteristics and has a low coefficient of friction $\mu$ so that there can be no risk of running trouble.

To improve the mechanical strength of the back coat layer further, it is preferable to incorporate therein fine particles of inorganic materials such as $SiO_2$, $TiO_2$, $Al_2O_3$, $\alpha$—$Fe_2O_3$, $Cr_2O_3$, SiC, and CaO. Preferably, these particles have an average particle diameter of the order of 0.1 to 0.5 µm, and are used in an amount of 0.1 to 5 parts by weight, particularly 0.5 to 2 parts by weight per 100 parts by weight of carbon blacks. When the content of such fine inorganic particles is too small, the mechanical strength of the back coat layer has a declining tendency, and when it is too much, there is an increase in the abrasion of guides with which tape comes into slide contact.

Additionally and if required, various additives usually incorporated in such a back coat layer, for instance, lubricants such as higher fatty acids, fatty acid esters and silicone oils, and dispersants such as surface active agents may be used in the present invention.

A coating material containing such components is prepared, and then coated on the non-magnetic base film. No particular limitation is placed on the solvent used, and one or two or more solvents such as ketones, e.g., methyl ethyl ketone, methyl isobutyl ketone, and cyclohexanone, and aromatic solvents, e.g., toluene may be used selectively upon the purpose. Also any specific limitation is not placed on the content of the solvent or solvents in the coating material.

No particular limitation is again imposed on the non-magnetic base film used; material selected from various flexible or rigid materials depending on the purpose may be formed into predetermined shape and size, e.g., tape according to various available standards. For instance, polyesters such as polyethylene terephthalate may be used as flexible materials.

To form the back coat layer on the base film, the coating material may be coated and dried on the base film in known manners. Then, the coated layer may be smoothened or otherwise treated on the surface, followed by curing. Preferably, the back coat layer has a thickness of the order of 0.2 to 2.0 µm, as measured after drying.

Preferably, the obtained back coat layer has a coefficient of friction µ of up to 0.25, particularly about 0.12 to 0.20. When the coefficient of friction µ of the back coat layer is too high, the running stability of the magnetic recording medium becomes worse, thus making the sticking of the magnetic recording medium to guides, etc., or other faults likely to occur.

The magnetic layer of the magnetic recording medium according to the present invention is not critical. For instance, use may be made of various coated types of known magnetic layers made up of ferromagnetic powders such as fine powders of oxides, e.g., $\gamma$—$Fe_2O_3$ that may contain Co, $Fe_3O_4$ that may contain Co, and $CrO_2$, and fine powders of Fe, Co, Ni or their alloys, or a continuous thin-film type of magnetic layers formed as by vacuum evaporation or sputtering. While the magnetic layer is formed on the surface of the non-magnetic base film opposite to the back coat layer, it is understood that when a coated type of magnetic layer is used as the magnetic layer, no limitation is placed on which layer is to be first formed and when a continuous thin-film type of magnetic layer is used, the magnetic layer is formed, followed by the provision of the back coat layer.

EXAMPLES

Illustrative examples of the present invention will now be given along with comparative examples.

Example 1

Magnetic recording media having the back coat and magnetic layers composed of the following components were prepared. It is here noted that the amounts of the components are given in part by weight.

| Composition of the Back Coat Layer | |
| --- | --- |
| Copolymer A | 40 |
| (Vinyl chloride-vinyl acetate-vinyl alcohol copolymer at the monomer weight ratio of 92:3:5 with the average polymerization degree of 420) | |
| Copolymer B | 25 |
| (Vinyl chloride-vinyl acetate-vinyl alcohol copolymer at the monomer weight ratio of 91:2:7 with the nitrogen atom content of 390 ppm and the average polymerization degree of 340) | |
| Polyurethane resin | 35 |
| (having the number-average molecular weight Mn of 40,000 and containing —$SO_3Na$ as the polar group) | |
| Small carbon black particles | 80 |
| (having the average particle diameter of 21 nm and the BET value of 220 $m^2/g$) | |
| Large carbon black particles | 1 |
| (having the average particle diameter of 350 nm and the BET value of 8 $m^2/g$) | |
| $\alpha$-$Fe_2O_3$ | 1 |
| (with the average particle diameter of 0.1 µm) | |
| Stearic acid | 1 |
| Myristic acid | 1 |
| Butyl stearate | 2 |
| Methyl ethyl ketone | 700 |
| Toluene | 400 |
| Cyclohexanone | 300 |

The above composition, herein called Sample No. 2, was used to prepare Sample Nos. 1–18 having varying contents and average polymerization degrees of Copolymers A and B, as shown in Tables 1 and 2.

Each sample was dispersed under agitation in a ball mill for 24 hours, and then mixed under agitation with 15 parts by weight of polyisocyanate to obtain a coating material for the back coat layer. It is noted that the carbon blacks used was commercial products manufactured by Colombian Carbon Corp., and the polyisocyanate used was Colonate L (an isocyanate product having a solid content of 75%) manufactured by Nippon Polyurethane Industries Co., Ltd.).

Each back coat layer-forming coating material of the above composition was coated on a non-magnetic base film of 14.5-µm thick polyester, dried, calendered, and otherwise treated to obtain a back coat layer of 0.5 µm in thickness.

| Composition of the Magnetic Layer | |
| --- | --- |
| Co-containing $\gamma$-$Fe_2O_3$ | 100 |
| (having the BET value of 45 $m^2/g$ and Hc of 860 Oe) | |
| Vinyl chloride-vinyl acetate-vinyl alcohol copolymer | 10 |
| (at the monomer weight ratio of 92:2:6) | |
| Polyurethane resin | 6 |
| (having the number-average molecular weight Mn of 40,000) | |
| $\alpha$-$Al_2O_3$ | 8 |
| (having the average particle diameter of about 0.2 µm) | |
| Stearic acid | 0.5 |
| Myristic acid | 0.5 |
| Butyl stearate | 0.5 |
| Methyl ethyl ketone | 200 |
| Cyclohexanone | 100 |

The above composition was dispersed under agitation in a ball mill for 24 hours, and then mixed under agitation with 3 parts by weight of polyisocyanate to obtain a magnetic coating material. The thus obtained coating material was coated on the non-magnetic base films having thereon back coat layer sample Nos. 1–18, and then oriented, dried, calendered, cured, and otherwise treated to obtain a 3.0-µm thick magnetic layer. In this manner, magnetic recording medium samples 1–18 were obtained.

The thus obtained magnetic recording media were estimated in terms of back coat wearing and electromagnetic characteristics (Y-S/N, and C-S/N) in the following manner. Estimation was done with the use of JVC BR-S711 (S-VHS Format VTR).

— Back Coat Wearing —

In environments of low temperature (0° C.), normal temperature and humidity (20° C. and 60% RH), and high temperature and humidity (40° C. and 80% RH), each tape sample was allowed to run in a VTR for a total of one hundred rounds. Following this, the sample was inspected visually and under an optical microscope for wearing and damaging of the back coat layer. In one environment, thirty-six rolls of tape were provided for each sample, and then allowed to run under the conditions mentioned above to make estimation of how many rolls were damaged upon the following criteria.
⊙: all the rolls were not damaged at all.
o: One or two rolls were damaged.
Δ: Three to five rolls were damaged.
X: More than six rolls were damaged.

— Electromagnetic Characteristics —

Y-S/N

Using a noise meter Model 925D (925C), Shibasoku Co., Ltd., brightness signal and noise level were measured for comparison during playback. This ratio is given in dB.
Signal: 50% level video signal
High-pass filter (HPF): 1 kHz
Low-pass filter (LPF): 4.2 MHz (4 MHz)
Visual correction: Not done

C-S/N

Using a noise meter Model 925D (925C) mfd. by Shibasoku Co., Ltd., color signal and noise level were measured for comparison during playback. This ratio is given in dB.
Signal: Signal having a 3.58 MHz signal of 0.72 Vp-p (at 75 Ω) superposed on a 50% level video signal
High-pass filter (HPF): 10 kHz
Low-pass filter (LPF): 500 kHz
Noise component to be measured: AM component Post-Storage Deterioration of Y-C/N (dB)

Each tape sample was stored in one environment of 50° C. and 80% RH for five days, and allowed to stand in another environment of 20° C. and 60% RH for an additional 24 hours. After this, the sample was loaded in JVC BR-S711 (S-VHS Format VTR) to record a signal of 7 MHz. Noise generated at 6 MHz upon reproduction of this signal was measured by a spectrum analyzer, and the ratio of the reproduced signal to this noise was then found. This ratio is given relative to 0 dB that each tape sample before storage showed.

The results of the above characteristics measured are set out in Tables 1 and 2 together with the contents and average polymerization degrees of Copolymers A and B.

TABLE 1

| Sample No. | 1 | 2 | 3 | 4 (comparison) | 5 (comparison) | 6 | 7 | 8 | 9 |
|---|---|---|---|---|---|---|---|---|---|
| Copolymer A (pbw) | 40 | 40 | 40 | 40 | 40 | 40 | 40 | 40 | 40 |
| (average polymerization degree) | 340 | 420 | 580 | 250* | 700* | 420 | 420 | 420 | 420 |
| Copolymer B (pbw) | 25 | 25 | 25 | 25 | 25 | 25 | 25 | 25 | 25 |
| (average polymerization degree) | 340 | 340 | 340 | 340 | 340 | 250 | 420 | 580 | 700 |
| Carbon black (nm) (Small: average particle diameter) | 21 | 21 | 21 | 21 | 21 | 21 | 21 | 21 | 21 |
| Carbon black (nm) (Large: average particle diameter) | 350 | 350 | 350 | 350 | 350 | 350 | 350 | 350 | 350 |
| Back Coat Wearing | | | | | | | | | |
| Low temperature (0° C.) | ⊙ | ⊙ | ⊙ | Δ | ⊙ | ⊙ | ⊙ | ⊙ | ⊙ |
| Normal temperature and humidity (20° C., 60% RH) | ⊙ | ⊙ | ⊙ | Δ | ⊙ | ⊙ | ⊙ | ⊙ | ⊙ |
| High temperature and humidity (40° C., 80% RH) | ⊙ | ⊙ | ⊙ | Δ | ⊙ | ⊙ | ⊙ | ⊙ | ⊙ |
| Electromagnetic characteristics | | | | | | | | | |
| Y-S/N (dB) | +0.7 | +0.7 | +0.7 | +0.8 | −0.1 | +0.8 | +0.7 | +0.7 | +0.7 |
| C-S/N (dB) | +0.7 | +0.7 | +0.6 | +0.8 | 0.0 | +0.7 | +0.7 | +0.6 | +0.6 |
| Post-storage deterioration of Y-C/N | −0.2 | −0.3 | −0.3 | −0.2 | −1.8 | −0.2 | −0.3 | −0.3 | −0.3 |

*Departing from the presently difined range

TABLE 2

| Sample No. | 10 (comparison) | 11 (comparison) | 12 | 13 | 14 (comparison) | 15 (comparison) | 16 | 17 | 18 |
|---|---|---|---|---|---|---|---|---|---|
| Copolymer A (pbw) | 40 | 40 | 50 | 30 | 0* | 65 | 40 | 40 | 40 |
| (average polymerization degree) | 420 | 420 | 420 | 420 | — | 420 | 420 | 420 | 420 |
| Copolymer B (pbw) | 25 | 25 | 15 | 35 | 65 | 0* | 25 | 25 | 25 |
| (average polymerization degree) | 150* | 900* | 340 | 340 | 340 | — | 340 | 340 | 340 |
| Carbon black (nm) (Small: average particle diameter) | 21 | 21 | 21 | 21 | 21 | 21 | 18 (*1) | 28 (*2) | 21 |
| Carbon black (nm) (Large: average particle diameter) | 350 | 350 | 350 | 350 | 350 | 350 | 350 | 350 | 270 (*3) |
| Back Coat Wearing | | | | | | | | | |
| Low temperature (0° C.) | Δ | ⊙ | ⊙ | ⊙ | Δ | ⊙ | ⊙ | ⊙ | ⊙ |

TABLE 2-continued

| Sample No. | 10 (comparison) | 11 (comparison) | 12 | 13 | 14 (comparison) | 15 (comparison) | 16 | 17 | 18 |
|---|---|---|---|---|---|---|---|---|---|
| Normal temperature and humidity (20° C., 60% RH) | Δ | ⊙ | ⊙ | ⊙ | Δ | ⊙ | ⊙ | ⊙ | ⊙ |
| High temperature and humidity (40° C., 80% RH) | Δ | ⊙ | ⊙ | ⊙ | x | ⊙ | ⊙ | ⊙ | ⊙ |
| Electromagnetic characteristics | | | | | | | | | |
| Y-S/N (dB) | +0.8 | 0.0 | +0.7 | +0.8 | +0.8 | +0.2 | +0.8 | +0.6 | +0.7 |
| C-S/N (dB) | +0.7 | −0.1 | +0.6 | +0.8 | +0.9 | +0.1 | +0.7 | +0.7 | +0.7 |
| Post-storage deterioration of Y-C/N | −0.1 | −1.7 | −0.3 | −0.2 | −0.1 | −1.5 | −0.1 | −0.3 | −0.1 |

(*1) Average particle diameter = 18 nm, BET = 200 m$^2$/g
(*2) Average particle diameter = 28 nm, BET = 240 m$^2$/g
(*3) Average particle diameter = 270 nm, BET = 10 m$^2$/g
*Departing from the presently difined range All Sample Nos. 1–18 of magnetic recording media had no problem in connection with running stability. As can be seen from Table 1, however, Sample No. 14 containing no Copolymer A, and Sample Nos. 4 and 10 containing Copolymers A and B each having too low a degree of polymerization were poor in running durability, with some wearing of the back coats. Also, Sample No. 15 containing no Copolymer B, and Sample Nos. 5 and 11 containing Copolymers A and B each having too high a degree of polymerization were found to be poor in such electromagnetic characteristics as Y-S/N and C-S/N, both decreased by 0.5 dB or more, and showed some significant post-storage deterioration of Y-C/N; they were unsuitable for practical use. It is here noted that Sample Nos. 1–3, 6–9, 12, 13, and 16–18 all conformed to the relations Ra≦20 nm and 50 nm≦Rmax−Ra≦350 nm.

Example 2

Sample Nos. 19–23 of magnetic recording media were prepared following Example 1 with the exception that the content and center particle diameter of the large carbon black particles of Sample No. 2 were varied as shown in Table 3.

Sample Nos. 19–23, 2, and 18 of magnetic recording media were inspected for the surface roughnesses (Ra and Rmax), the coefficient of friction μ, specular gloss of the back coating material, and RF output in the following procedures, and estimated as well in terms of snarling or other run trouble in the environment of 20° C. and 60% RH.

—Surface Roughness —

Using a TALYSTEP system, Tailor-Hobson Corp., or a stylus type of surface shape measuring device, measurements were obtained according to JIS B-0601 under the following conditions.
Filter condition: 0.18 to 9 Hz
Stylus pressure: 2 mg
Stylus used: a special stylus of 0.1×2.5 μm
Scan speed: 0.03 mm/sec.
Scan length: 500 μm
Rmax and Ra were calculated from the measurements obtained.

—Coefficient of Friction μ—

A tape friction tester, Shimada Giken Co. was used. Tape was wound 180° with the back coat brought into contact with a stainless pin of 3 mm in diameter. Under a constant back tension, any desired constant about 50-mm portion of tape was run at the speed of 1.1 cm/sec. for a total of 200 rounds. The coefficients of friction μ of tape measured prior to the run and after 200 rounds are called the initial and endurance coefficients of friction, respectively.

—Specular Gloss of Back Coat —

A digital glossmeter GM-3D, Murakami Shikisai Kenkyusho Co. was used. Gloss was measured at an angle of 60° under the optical conditions according to JIS Z-8741.

—Running trouble or Other Trouble —

Thirty-six (36) rolls of tape were provided for each tape sample, and allowed to run in a VTR for a total of 100 rounds in the environment of 20° C. and 60% RH to check running trouble or other trouble. In Table 3 "NG" shows that more than one roll snarled up and "OK" indicates that the rolls did not snarl up at all.

—RF Output—

A 7-MHz RF signal was recorded with a reference recording current (the optimum recording current for reference tape) to obtain an output level, which was then compared with that of reference tape and designated in dB.

Measurement of Brightness Signal: RF 7 MHz—Output

A 7-MHz sine wave was recorded on each sample with a reference recording current, and its output was read on a spectrum analyzer.

Measurement of Chrominance Signal: RF 629 kHz—Output

A 629-kHz signal was recorded with a varying recording current, while superposed on the 7-MHz recording current in measuring the brightness signal, to find a recording current at which a spurious noise (Y-2C noise) of −22 dB was obtained during playback. With the thus found optimum recording current, the 629-kHz signal was superposed on the 7-MHz signal for recording, and a 629-kHz component of the output was found as chrominance signal output.

—DO after Storage at High Temperature and High Humidity—

For measurement of drop-out, each tape sample was stored for five days in one environment of 50° C. and 80% RH, and then allowed to stand in another environment of 20° C. and 60% RH for an additional 24 hours. The criterion of drop-out was whether or not an output decrease of more than 16 dB continued over a period of more than 15 μs. The measurement was conducted for 10 minutes, and Table 3 shows a drop-out per minute. Used for this measurement was JVC BR-S711 (S-VHS Format VTR).

The measurements obtained as mentioned above are set out in Table 3 along with the content and average particle diameter of the large carbon black particles used.

TABLE 3

| Sample No. | 2 | 18 | 19 | 20 | 21 (comparison) | 22 | 23 |
|---|---|---|---|---|---|---|---|
| Carbon black (pbw) (Large: average particle diameter) | 1 | 1 | 3 | 4 | 0* | 8** | 1 |
| Carbon black (nm) (Large: average particle diameter) | 350 | 270 | 350 | 350 | — | 350 | 750** |
| Surface roughness | | | | | | | |
| Rmax (nm) | 150 | 130 | 170 | 180 | 60 | 180 | 450 |
| Ra (nm) | 15 | 13 | 15 | 17 | 12 | 30** | 40** |
| Rmax − Ra (nm) | 135 | 117 | 155 | 163 | 48 | 150 | 410** |
| Coefficient of friction μ | | | | | | | |
| Initial | 0.12 | 0.13 | 0.13 | 0.12 | 0.30 | 0.12 | 0.11 |
| Endurance | 0.15 | 0.15 | 0.14 | 0.14 | 0.50 | 0.14 | 0.13 |
| Specular gloss of back coat (%) | 120 | 122 | 118 | 115 | 125 | 95 | 105 |
| Running Trouble | OK | OK | OK | OK | NG | OK | OK |
| Electromagnetic characteristics | | | | | | | |
| RF 7 MHz-OUT (dB) | +1.5 | +1.6 | +1.5 | +1.5 | +2.0 | +1.0 | −2.0 |
| RF 629 kHz-OUT (dB) | +1.1 | +1.3 | +1.1 | +1.0 | +1.1 | +0.5 | 0.0 |
| DO after storage at high temperature and humidity (15 μs-16 dB) | 3.8 | 3.0 | 4.2 | 5.0 | 2.5 | 20.0 | 25.0 |

*Departing from the presently difined range
**Departing from the preferable range As can be seen from Table 3, Sample No. 21 containing no large carbon black particles was found to have a much reduced value for Rmax−Ra due to too low Rmax, and a much reduced coefficient of friction μ or poor running stability with an increased run trouble. In addition, some considerable wearing of the back coat was observed. The back coats of Sample Nos. 2, and 18–20, each containing the large carbon black particles in the preferable range, were much lower in wearing than that of Sample No. 22 containing the large carbon black particles in an amount exceeding the upper limit of the preferable range. In addition, these samples were found to be much more improved in terms of Ra, the specular gloss of the back coat, and RF output, and show a decreased drop-out after storage at high temperature and high humidity. Moreover, these samples were found to be much more improved than Sample No. 23 containing large carbon black particles with the average particle size exceeding the upper limit of the preferable range in terms of Ra, Rmax−Ra, the surface properties of the back coat layer, and RF output, and show a decreased wearing of the back coat and a decreased drop-out after storage at high temperature and high humidity.

What is claimed is:

1. A magnetic recording medium including a non-magnetic base film, and a magnetic layer on one surface thereof and a back coat layer on the other surface thereof, wherein said back coat layer contains two carbon blacks differing in the average particle diameter, and a binder, said binder containing a vinyl chloride-alkylcarboxylic acid vinyl ester-vinyl alcohol copolymer A having an average polymerization degree of 300 to 600 and a vinyl chloride-alkylcarboxylic acid vinyl ester-vinyl alcohol copolymer B containing an amino group, and having an average polymerization degree of 200 to 800, wherein the surface roughnesses Rmax and Ra of said back coat layer conform to:

$Ra \leq 20$ nm $350$ nm $\geq$ Rmax−Ra $\geq 50$ nm.

2. A magnetic recording medium as recited in claim 1, wherein said back coat layer contains 15 to 120 parts by weight of said copolymer B per 100 parts by weight of said copolymer A.

3. A magnetic recording medium as recited in claim 1, wherein said copolymer A contains 77 to 96.5% by weight of vinyl chloride, 0.5 to 8% by weight of alkylcarboxylic acid vinyl ester, and 3 to 10% by weight of vinyl alcohol.

4. A magnetic recording medium as recited in claim 1, wherein said copolymer B contains 72 to 96.45% by weight of vinyl chloride, 0.5 to 8% by weight of alkylcarboxylic acid vinyl ester, 3 to 10% by weight of vinyl alcohol, and 0.05 to 5% by weight of an amino group-containing vinyl unit.

5. A magnetic recording medium as recited in claim 1, wherein said carbon blacks are a carbon black of a small particle diameter as represented by an average particle diameter of 15 to 30 nm, and a carbon black of a large particle diameter as represented by an average particle diameter of 200 to 400 nm.

6. A magnetic recording medium as recited in claim 5, wherein said back coat layer contains 0.5 to 5 parts by weight of said carbon black of a large particle diameter per 100 parts by weight of said carbon black of a small particle diameter.

7. A magnetic recording medium as recited in claim 5, wherein said carbon black of a small particle diameter has a BET value of 100 to 300 $m^2/g$, and said carbon black of a large particle diameter has a BET value of 5 to 20 $m^2/g$.

8. A magnetic recording medium as recited in claim 1, wherein said back coat layer contains 50 to 200 parts by weight of said binder per 100 parts by weight of said carbon blacks.

9. A magnetic recording medium as recited in claim 1, wherein said binder further contains polyurethane having a polar group.

* * * * *